Figure 1:
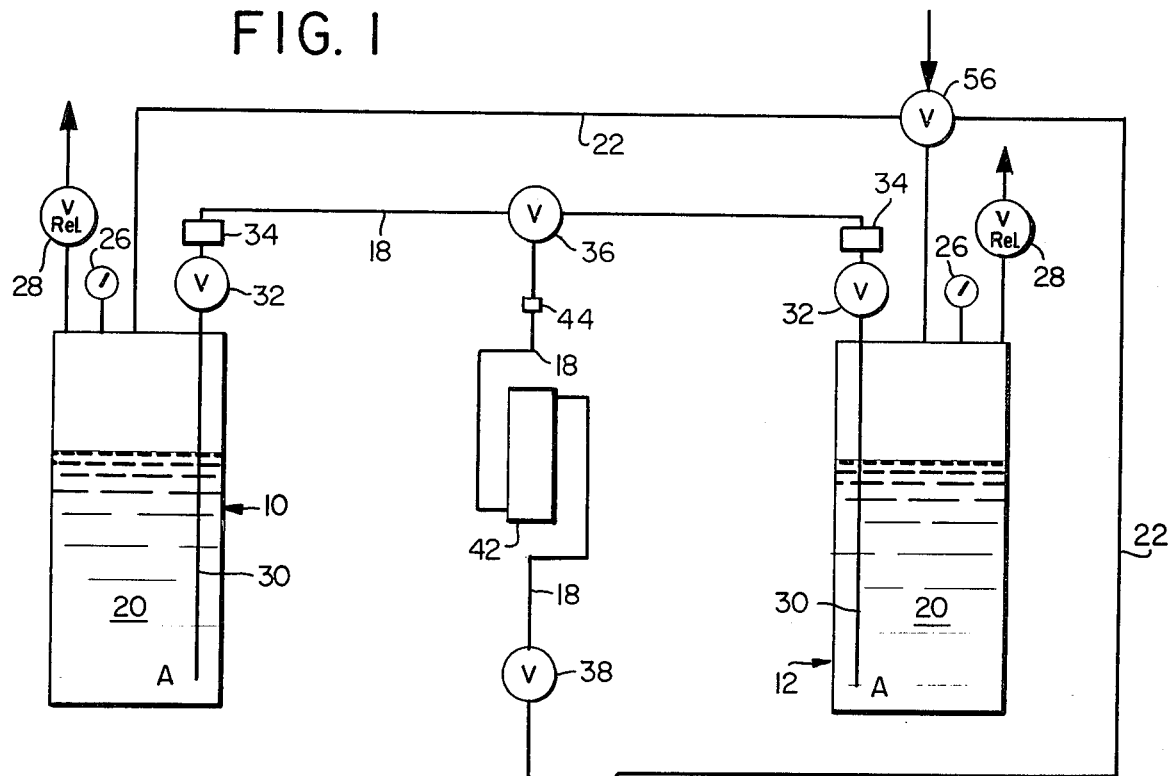

United States Patent [19]

Nesgood et al.

[11] 4,252,844

[45] Feb. 24, 1981

[54] PROCESS FOR MIXING LIQUID ADDITIVES WITH SOLID MATERIALS UNDER SONIC VELOCITY CONDITIONS

[75] Inventors: Patrick J. Nesgood, Clark, N.J.; James H. Faler, Beaver Dams, N.Y.

[73] Assignee: Union Carbide Corporation, New York, N.Y.

[21] Appl. No.: 928,098

[22] Filed: Jul. 26, 1978

[51] Int. Cl.³ .............................................. B32B 7/02
[52] U.S. Cl. ................................... 427/213; 427/221; 427/212; 427/220; 118/303
[58] Field of Search ................ 239/102, 434; 118/303; 427/213, 220, 221, 222, 212

[56] References Cited

U.S. PATENT DOCUMENTS

| | | | |
|---|---|---|---|
| 1,854,100 | 4/1932 | Brito | 118/303 |
| 2,600,882 | 6/1915 | Kellet | 118/303 |
| 2,658,847 | 11/1953 | McDonald | 118/303 |
| 3,009,826 | 11/1961 | Straughn | 118/303 |
| 3,240,254 | 3/1966 | Hughes | 239/102 |
| 3,351,979 | 11/1967 | Buonquito | 118/303 |
| 3,447,950 | 6/1969 | Evans et al. | 427/213 |
| 3,548,282 | 12/1970 | Bergquist | 118/303 |
| 4,117,801 | 10/1978 | Dannelly | 118/303 |

*Primary Examiner*—Sam Silverberg
*Attorney, Agent, or Firm*—Clement J. Vicari

[57] ABSTRACT

A process is disclosed for the mixing of relatively small amounts of liquid or liquefied additive with relatively large amounts of solid granular material comprising: forming, in a conduit, a continuous pneumatic- or gravity-borne stream of solid granular material; passing an inert gas stream through a constricting orifice to maintain sonic velocity flow conditions therein; concurrently introducing a stream of said liquid or liquefied additive into said inert gas stream in said constricting orifice under conditions such that combined stream sonic velocity flow conditions are maintained; and introducing the resulting combined liquid or liquefied additive and inert gas streams into said conduit to effect addition of said liquid or liquefied additive to said solid granular material.

6 Claims, 2 Drawing Figures

PROCESS FOR MIXING LIQUID ADDITIVES WITH SOLID MATERIALS UNDER SONIC VELOCITY CONDITIONS

The present invention relates to a process for mixing liquid additives with solid materials and, more particularly, to such a process for the continuous and uniform mixing of relatively small amounts of liquid or liquefied additives with relatively large amounts of solid granular material.

There are many industrial applications requiring a process for mixing liquid additives with solid materials to accomplish a wide variety of results. Many of these industrial applications are quite adequately carried out in the practice of known processes, where relatively substantial amounts of liquid or liquefied additives are desired to be continuously and uniformly mixed with solid granular materials. Difficulty is encountered when dealing with the problem of such mixing on a continuous and uniform basis with relatively small amounts of liquid or liquefied additive and relatively large amounts of solid granular material.

Typical of such industrial applications is the addition coating of liquid catalyst on the surface of solid granular catalyst support material. Another recognized field of application is the addition of liquid flow enhancers for granular solids such as particulate coal. Another field of application involves the uniform mixing of small amounts of liquid or liquefiable additives to synthetic thermoplastic resins to add characteristics to protect the resin or enhance its fabrication and/or its end use performance.

The process of the present invention is equally applicable to each of these fields of application as well as to a wide variety of others and it is to be understood that, whereas further description of the process herein is specifically directed to application to the synthetic thermoplastic resin field, the operability and benefits of the process are not to be considered limited thereto as to scope.

One step that is usually necessary during the production, storage, and distribution of plastic resins is the addition of small amounts of additive(s). These additives are usually supplied as a granular or powdered material and are typically added to the resin while the resin is being pneumatically conveyed, or is flowing by gravity through a duct or chute, or is being homogenized in a suitable dry bulk mixer. Some of the performance objectives for such an additive feeding process, assuming a substantially constant or regular intermittent resin flow, are:

1. The process can be accurately adjusted to feed additive, at the required preselected mass flow rate, continuously or intermittently;
2. The process should maintain this selected rate accurately and reliably;
3. The process should allow a measurement of its feed rate to ensure maintenance of the preselected rate;
4. The process should allow accurate changes in its rate while in operation to account for a change in resin flow rate or for desired changes in additive/resin concentration.
5. The process should permit remedial action and/or prevent continued production of resin that is low in additive, should the additive flow rate drop below a preselected value.

Some prior granular material feeders are capable of meeting these objectives while handling many additives. However, these feeders are complicated and expensive and are often unreliable when handling some additive materials, especially those materials that agglomerate or cake, cohere to and foul the feeder, and/or have low melting points.

The process of the present invention eliminates these difficulties. It is simple and meets the performance objectives set forth hereinabove. It is applicable for those granular additives which can be liquefied (thermally or chemically) without deleteriously affecting their performance and for liquid additives.

In accordance with the present invention, a process is provided for the mixing, preferably continuously and very uniformly of relatively small amounts of liquid or liquefied additive with relatively large amounts of solid granular material comprising: forming, in a conduit, a continuous pneumatic- or gravity-borne stream of said solid granular material; passing an inert gas stream through a constricting orifice to maintain sonic velocity flow conditions therein; concurrently introducing a stream of said liquid or liquefied additive into said inert gas stream in said constricting orifice under conditions such that combined stream sonic velocity flow conditions are maintained; and introducing the resulting combined liquid or liquefied additive and inert gas streams into said conduit to effect addition of said liquid or liquefied additive to said stream of solid granular material, preferably as a coating on said granular material.

As employed herein, the term "relatively small amounts" is understood to mean amounts of the order of up to about 1 to 2 percent by weight of the liquid or liquefied additive relative to the weight of the relatively large amounts of solid granular bulk material. As employed in the application of the process of the invention to the mixing of synthetic thermoplastic resin material with additives, such term being understood to mean addition of additive up to about one percent by weight of the resin and preferably in the range of from 0.005 to 0.15 percent by weight of the resin.

As employed herein, the term "thermoplastic material" is understood to include all synthetic organic materials having thermoplastic characteristics. Certain synthetic organic resins, such as polyethylene, polystyrene, polysulfone, and polyvinyl chloride, are widely recognized as possessing thermoplastic characteristics. Other resins, such as phenolic resins and those having high filler additions, are widely accepted as thermosetting resins. It is, however, to be noted that such resins do exhibit thermoplastic characteristics until they are reacted at a temperature and for a time sufficient to produce the cross-linking necessary to cause them to exhibit thermosetting characteristics. Therefore, it is to be understood that such uncrosslinked thermosettable materials are to be regarded as thermoplastic materials within the scope of the present invention.

It should be additionally noted that additives which are normally incorporated with high density polyethylene resins in order to stabilize the resins in respect to heat, oxidation, light and the like can be employed as thermoplastic resin additives in the present invention; such stabilizers include, for example, 2,2'-thiobis-4-methyl-6-tert-butyl phenol, dilaurylthiodipropionate, as well as various other amine type and phenolic stabilizers known to the art. Other additives, lubricants, plasticizers, slip agents, mold release agents, flame retardants, and colorants can be employed, as well as the stabilizing additives discussed above.

The inert gas stream employed may consist of gases such as methyl chloride, propylene, butylene and gaseous fluorocarbon, as well as gases such as nitrogen, argon, helium, carbon dioxide, air or the like. Any gas, non-reactive under conditions encountered in the process of the invention, is viewed as an "inert gas" within the scope of the process of the present invention.

As employed herein, the term "liquid or liquefied additive" means either an additive in liquid form or one susceptible of being liquefied by the application of either heat and consequent melting to a liquid state, or dissolved by use of a solvent or otherwise chemically suspended in a liquid media. The solvent may comprise an organic or inorganic liquid which must, of necessity, be non-reactive with the additive as well as the solid granular bulk material in the process of the invention.

As will be understood by those skilled in the art, consideration must be given to the relative pressures and velocities of the inert gas stream and the stream of solid granular material. For example, it has been found that, when injecting an atomized, inert gas-borne stream of additive liquid into a pneumatic-borne stream of solid granular material having a sufficiently high pneumatic pressure, this injection can be carried out by injection directly into the pneumatic-borne stream without adversely influencing that stream. On the other hand, when injection is carried out by injection into a gravity-borne stream of solid granular material, the injector must be positioned at a stand-off distance from the gravity chute conduit in order to prevent adverse effects on the stream of solid granular material. Variations between direct injection and maximum stand-off distance injections will be encountered between such extremes, depending upon the pressure and velocity of the injected stream of liquid additive as against the pressure of the stream of solid granular material. Selection of parameters in order to satisfy these variations is well within the skill of the art.

It is to be understood that the liquid coating of the particles in the stream of solid granular material, in accordance with the present invention, contemplates the drying and/or solidification of the liquid additive coating prior to the arrival of the coated material at downstream storage facilities. This drying and/or solidification may be effected by heating, if desired, and is assisted by the passage of the solid material particles through the gas-bearing stream downstream of the point of injection for mixing. As employed herein, the term "coating" means a substantially continuous liquid layer of additive on the surface of the solid granular material and may either involve or not involve permeation of the solid material by some of the liquid additive material of the layer.

In the application of the process of the invention to the mixing of additives to thermoplastic resin compositions, it is understood that the final homogenization of the additive coating and the solid thermoplastic resin granular material need not be completed until subsequent treatment of the additive coated solid resin material in a subsequent extrusion or other compounding step which is practiced on the product of the process of the present invention.

In the accompanying drawing:

FIG. 1 sets forth, in schematic form, apparatus suitable for carrying out the process of the invention; and FIG. 2 is an exploded sectional view of the atomizing nozzle shown schematically in FIG. 1.

Referring specifically to FIG. 1 of the drawing, apparatus suitable for carrying out the process of the invention may consist of two closed supply tanks or reservoirs 10 and 12, an atomizing nozzle 14, gas delivery lines 16, and liquid delivery lines 18, together with the necessary valves, flowmeters, sensors, and filters.

The two supply tanks or reservoirs 10 and 12 are heated pressure vessels which alternately serve as reservoirs for the liquid delivery system or as melting pots to liquefy the granular additive. The liquid 20 is maintained at a constant temperature, as indicated by the thermometers (not shown) which may be fitted to each tank. Low supply level is signaled by a sensor (not shown) which may be placed near the bottom of each tank. When in use as a reservoir for liquid delivery line 18, the tank is pressurized by a line 22 which is in communication with the atomizing nozzle gas supply pipe. Each tank is fitted with a pressure gage 26 and relief/vent valve 28, a dip tube 30 feeds the liquid through a shut-off valve 32 and filter 34 to a 3-way valve 36. The 3-way valve permits one of the tanks to feed liquid into the liquid delivery system 18, while the remaining tank is depressurized, recharged, and held in standby until the first tank's supply is depleted.

The liquid delivery system is used to control, measure and deliver the liquid flow from either tank 10 or 12 to the atomized nozzle 14. The flow rate is controlled by a needle valve 38 to adjust the rate and an on-off solenoid valve 40. The flow rate is measured by a calibrated flowmeter 42. A flow switch 44 is included which activates an alarm if the solenoid valve is open and the flow drops below a preselected value.

The atomizing nozzle 14 is supplied with gas and liquid and is shown in cross-section in FIG. 2. The gas duct 15 through the nozzle first decreases from its initial diameter, $d_1$, to a smaller diameter, $d_2$, at the throat region B and then increases to a larger diameter, $d_3$ at the nozzle exit. The liquid passageway 45 is connected to the gas duct 15, via one or more radial holes 46 which are located at, or slightly upstream of, the minimum diameter throat of the gas duct. Liquid flowing through these holes is atomized by and entrained in the gas flowing through the gas duct. The liquid droplets are carried by the gas stream until they impinge on the resin flow in the conveying line, gravity chute, blender, etc. The nozzle, liquid delivery system, and supply tanks are all maintained at a substantially constant, elevated temperature, Tm, by electric, steam or tempered water tracing.

The gas delivery system 16 controls, measures, heats, and delivers the gas flow from a higher pressure supply to the atomizing nozzle. The gas flow from inlet line 47 (through filter 48) is controlled by a pressure regulator 49 and is measured by a suitable flow meter 50. The flow switch 51 is used to indicate flow or no-flow condition. A heat exchanger 52 heats the gas to an approximately constant temperature, To. The flow switch is included in the gas delivery line to automatically shut the liquid solenoid valve if the gas flow rate drops below a preselected value. Since the liquid supply tank headspace is in direct communication with the gas supply line at or slightly upstream of the atomizing nozzle gas duct inlet 15, the tank headspace and atomizing nozzle gas duct inlet are at the same pressure, Po.

In summary there is provided at least one gas-tight reservoir for the liquid or liquified additive. The additive is supplied to constricting orifice 14 by forcing the additive from the reservoir by pressurizing the reservoir at pressure substantially equal to the pressure of the inert gas stream. Most preferably, pressure in reservoir 10 is maintained equal to that of inert gas conduit 16 by providing a conduit 22 connecting the inert gas conduit 16 with reservoir 10.

The granulated solid material conduit 54 may, as shown in FIG. 1 of the drawing, have externally positioned heating elements 55 for elevating the temperature of the conduit.

The operation of the system involves the following sequence of steps:

1. One supply tank 10 is charged with additive and heat is applied to the tanks, liquid delivery system, and spray nozzle with the tank shutoff valve 32 in the closed position.
2. The range of pressure existing in the pneumatic conveying line, gravity chute, etc. fed by the nozzle is measured and the maximum pressure, Pm, is determined.
3. The electrical control system is energized.
4. A preselected gas flow is established through the gas delivery system and atomizing nozzle by adjusting the pressure regulator 49. The selected supply tank is pressurized by adjusting the 3-way gas valve 56. The regulator is adjusted until the tank pressure and nozzle inlet pressure reach a preselected value, Po.
5. The gas system heat exchanger 52 is activated and the input to this exchanger is adjusted until the gas temperature at the input to the nozzle reaches a preselected value, To.
6. The gas system regulator 49 is re-adjusted (if necessary) to restore a tank pressure equal to Po. The criteria used to determine Po and To are discussed hereinbelow.
7. When the material in the selected supply tank has reached the preselected temperature, Tm, the liquid 3-way valve 36 is adjusted to put the liquid delivery line in communication with the tank dip tube 30. The tank shutoff valve 32 at the selected supply tank is opened. When the solenoid valve 40 is activated (by a sensor which signals when resin flow is present) the liquid flows through the nozzle.
8. The needle valve 38 is adjusted until the liquid flow rate, as indicated by the flow rate measuring device 42 reaches the desired value.
9. The alternate supply tank 12 is then charged with additive, heated, and placed on stand-by until the first tank's supply is depleted, as indicated by its level sensor 24. Switching to the second tank is accomplished by adjusting the 3-way gas valve 56, opening the shutoff valve 32, and adjusting the 3-way liquid valve 36.

It is believed that the theory of operation of the process of the present invention may be explained as follows:

Liquid flow through the system is driven by establishing a pressure gradient between the dip tube entry (A) and the liquid orifices outlet in the atomizing nozzle 14. Hydrostatic pressure differences caused by variations in the elevations of the tank liquid level and nozzle can be neglected in most cases, since these differences can be made small compared to the difference established by the gas flow. The pressure at (A) is, therefore, approximately equal to Po and the pressure at the liquid orifice is equal to $P_1$, $P_1$ is significantly less than Po because the gas flow is accelerated in the converging section of the nozzle. In general, $P_1$ depends on the geometry of the nozzle, Po, and the nozzle back pressure, which is equal to Pv, the pressure in the pipe or vessel being fed by the nozzle. However, if Po is increased so that $Po \geq Pv/(Pc/Po)$ the nozzle is said to be choked, a sonic condition exists at the nozzle throat, and the pressures at and upstream of the nozzle throat become independent of Pv. Pc is the critical pressure and $$Pc = \left(\frac{2}{k+1}\right)^{k/k-1} Po,$$

where k, the ratio of specific heats, is a property of the gas. For example, if the liquid orifices are located at the nozzle throat, then $P_1 = Pc$, if $Po \geq Pv/(Pc/Po)$. If the maximum value of Pv is Pm, then the nozzle will be choked if $$Po = \frac{Pm}{(Pc/Po)}.$$

For these conditions, then, the liquid pressure gradient from the points (A) to (B) will be $$\Delta P_l = Po - P1 = Po - Po\left[\frac{2}{(k+1)}\right]^{k/k-1} =$$
$$Po\left[1 - \left(\frac{2}{k+1}\right)^{k/k-1}\right]$$

For a given gas composition, temperature, and pressure, Po, $\Delta P_l$ is constant, regardless of variation in Pv (if Pv<Pm). Since $\Delta P_l$ is constant, the liquid flow rate for fixed valve settings etc., will also be constant if the liquid viscosity does not change. This, in turn can be assured by maintaining the liquid at a constant temperature, Tm. In practice, Po is chosen to be substantially greater than Pm/(Pc/Po) to account for viscous effects in the nozzle gas flow and to insure that hydrostatic pressure changes can be neglected.

As the gas accelerates in the nozzle, the temperature also decreases. For an upstream temperature, To, the temperature at the throat of a choked, adiabatic nozzle will be $$T_1 = \left(\frac{2}{k+1}\right) To.$$

Therefore, To is chosen so that $T_1 \geq Tm$, the liquid temperature, or $$To > Tm\frac{k+1}{2},$$

to prevent the liquefied material from solidifying.

It has been found that, in comparison to granular solids addition systems, the liquid system described herein is simpler and more reliable. If the operating parameters are properly selected and set, this system provides additive feeding at a substantially constant rate, independent of downstream pressure fluctuations, without a mechanical pump or other moving parts. The liquid flow is easier to detect, measure, and control. The small liquid droplets formed in the atomizing nozzle provide better initial dispersion in the resin. In addition, the granular additive can separate from the resin during subsequent handling. In constrast, the melted additive solidifies on the resin, becomes mechanically bonded to it and, therefore, there is much less tendency for the two materials to separate during subsequent processes.

EXAMPLE

Figure 2:
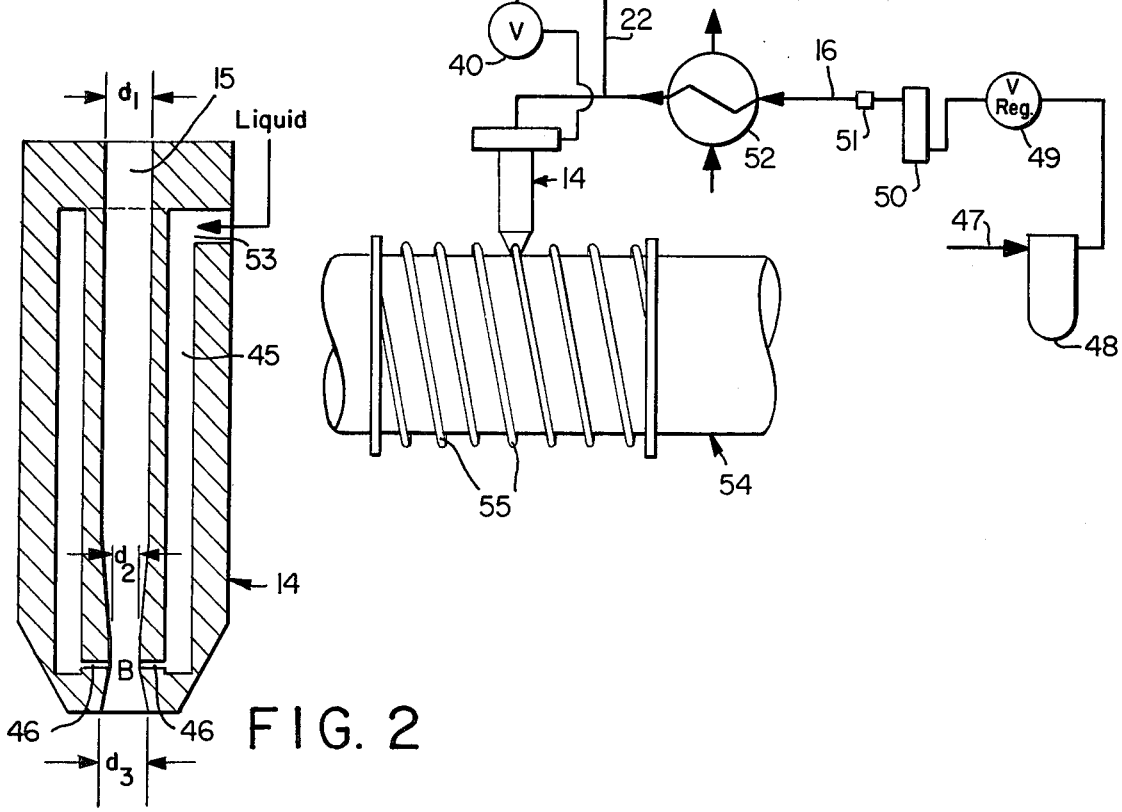

In an example of the process of the invention, apparatus such as shown in FIGS. 1 and 2 of the drawing was employed.

"Irganox" (Ciba-Geigy) 1076 (octadecyl 3-(3',5'-di-tert-butyl-4'-hydroxyphenyl)propionate or (octadecyl 3,5-di-tert-butyl-4-hydroxyhydrocinnamate)antioxidant, having been melted to 80° C., was fed through an appropriate feed line and control and indicating instruments to the spray nozzle at 8.9 cc/minute, a concentration of 0.01% (based on instantaneous mass conveying rate of granular high density polyethylene resin).

The feeding action was accomplished due to the pressure differential between the melt tank and the spray nozzle orifice. In this case, the pressure in the melt tank being 30 psig and that of the throat nozzle was approximately 28.5 psig.

The liquefied additive was sprayed from the nozzle with gaseous nitrogen, having been heated to 140° C. at a constant rate of 1.1 SCFM, into a 2 inch conveying line. The conveying line, at a pneumatic pressure of 12 psig, had passing through it high density polyethylene resin, having a temperature of approximately 90° C., at an instantaneous mass conveying rate of 10,000 pounds per hour.

The additive was deposited on hot resin and then solidified as the resin/additive mixture cooled to below the additive melting point (55° C.) in the conveying line, all before passing to a storage bin.

What is claimed is:

1. A process for the continuous and uniform mixing of relatively small amounts of liquid or liquefied additive with relatively large amounts of solid granular material comprising: forming, in a conduit, a continuous pneumatic- or gravity-borne stream of said solid granular material; passing an inert gas stream through a constricting orifice to maintain sonic velocity flow conditions therein; concurrently introducing a stream of said liquid or liquified additive into said inert gas stream in said constricting orifice under conditions such that combined stream sonic velocity flow conditions are maintained; introducing the resulting combined liquid or liquified additive and inert gas streams into said conduit to effect addition of said liquid or liquified additive to said solid granular material as a coating thereon, providing a gas-tight reservoir for said liquid of liquified additive, and supplying said additive to said constricting orifice by forcing said additive from said reservoir by pressurizing said reservoir at pressure substantially equal to the pressure of said inert gas stream.

2. The process in accordance with claim 1, wherein said liquid or liquefied additive comprises up to about 1 to 2 percent by weight that of said solid granular material.

3. The process in accordance with claim 2, wherein said liquid or liquefied additive comprises between about 0.005 to 0.15 percent by weight of said solid granular material.

4. The process in accordance with claim 1, wherein said solid granular material is thermoplastic material.

5. The process in accordance with claim 1, wherein said inert gas is nitrogen.

6. The process of claims 1, 2, 3, 4 or 5 further comprising the steps of:
supplying said inert gas to said constricting orifice by a first conduit, and
providing a second conduit connecting said first conduit with said reservoir.

* * * * *